United States Patent [19]

Balduff et al.

[11] Patent Number: 4,709,808
[45] Date of Patent: Dec. 1, 1987

[54] DEGRADABLE POLYMER COMPOSITION AND ARTICLES PREPARED FROM SAME

[75] Inventors: Dennis C. Balduff, Toledo; Saleh A. Jabarin, Holland, both of Ohio

[73] Assignee: Owens-Illinois Plastic Products Inc., Toledo, Ohio

[21] Appl. No.: 920,296

[22] Filed: Oct. 17, 1986

Related U.S. Application Data

[63] Continuation-in-part of Ser. No. 856,638, Apr. 25, 1986, abandoned, which is a continuation of Ser. No. 726,487, Apr. 24, 1985, abandoned, which is a continuation of Ser. No. 524,279, Aug. 18, 1983, abandoned.

[51] Int. Cl.$^4$ .................... C08J 3/20; B65D 71/00; C08L 23/06; C08L 23/12
[52] U.S. Cl. .................... 206/158; 206/427; 206/524.6; 206/819; 220/DIG. 30; 260/DIG. 43; 525/185
[58] Field of Search ................ 525/185; 206/158

[56] References Cited

U.S. PATENT DOCUMENTS

| | | | |
|---|---|---|---|
| 3,248,359 | 4/1966 | Maloney | 525/185 |
| 3,741,421 | 6/1973 | Wittwer | 215/217 |
| 3,778,096 | 12/1973 | Smith | 206/150 |
| 3,860,538 | 1/1975 | Guillet et al. | 525/214 |
| 3,865,302 | 2/1975 | Kane | 229/43 |
| 3,929,727 | 12/1975 | Russell et al. | 524/612 |
| 3,948,404 | 4/1976 | Collins | 215/1 C |
| 3,968,082 | 7/1976 | Hudgin | 524/302 |
| 4,139,094 | 2/1979 | Berry et al. | 206/158 |
| 4,372,311 | 2/1983 | Potts | 128/156 |
| 4,623,581 | 11/1986 | Herf | 525/185 |

FOREIGN PATENT DOCUMENTS

| | | | |
|---|---|---|---|
| 1000000 | 11/1976 | Canada | 220/DIG. 30 |
| 2316697 | 10/1973 | Fed. Rep. of Germany | 220/DIG. 30 |

OTHER PUBLICATIONS

"Escorene Linear Low Density Polyethylene Resins," *Exxon Chemicals*, 9 pages, no date, no author.

*Primary Examiner*—Carman J. Seccuro
*Attorney, Agent, or Firm*—H. G. Bruss

[57] ABSTRACT

A group of degradable polymer compositions including admixtures of ethylene-carbon monoxide copolymer with defined proportions of high density polyethylene, linear low density polyethylene or polypropylene is disclosed. The compositions are useful for forming article carriers, containers, closures, foodtrays and the like, which show excellent mechanical and structural properties and controlled environmental degradability.

19 Claims, 10 Drawing Figures

DEGRADABLE POLYMER COMPOSITION AND ARTICLES PREPARED FROM SAME

This application is a continuation-in part application of Ser. No. 856,638 filed Apr. 25, 1986, now abandoned; Ser. No. 856,638 being a continuation application of Ser. No. 726,487 filed Apr. 24, 1985, now abandoned, which, in turn, is a continuation of Ser. No. 524,279 filed Aug. 18, 1983, now abandoned.

BACKGROUND OF THE INVENTION

The present invention relates to environmentally degradable articles, films, bags together with containers fabricated from the degradable polymeric compositions.

A wide variety of environmentally degradable polymeric compositions have been used for the fabrication of containers, article carriers, films, bags and the like in the past. Many of these polymeric compositions required the use of photosensitive additives to a host polymer to impart environmental degradability to the articles, particularly by photodegradation mechanisms. The use of such additive systems have caused substantial problems in the past. For example, such polymer-photosensitive additive systems have exhibited spontaneous separation of the components or component migration to surface of the article during and after melt extrusion. Further, such additive systems are often subject to discoloration or odor generation during processing of the melt. This requires the addition of dye colorants to maintain an acceptable product appearance. Further, such systems have had poor extrusion viscosity characteristics and poor thermoformability and have not exhibited the requisite stiffness or flexibility for certain applications.

Article carriers for bottles comprise rigid carriers capable to snap-fit engagement with the neck finish portion of filled bottles. Such rigid carriers usually include a downwardly depending sidewall portion attached to a centrally located top panel, which sidewall portions engage the shoulder portions of the containers held within the carrier. The top panel includes a plurality of bottle neck engaging portions which hold the neck finishes of the containers in a predetermined geometric array. Rigid carriers are usually fabricated from a melt extrudable polymer which can subsequently be thermoformed into irregular geometric shapes. The material must also have the required stiffness to hold the container necks within the carrier and still have degradability on environmental exposure after its normal service life.

Rigid carriers are usually formed from an extruded blank and the final shape thermoformed from the blank into individual carriers. In addition to the extrudability and thermoforming properties, the material must include adequate stiffness characteristics for retaining heavy, filled containers during transportation, storage and use. Also, the material must have sufficient balanced degradability characteristics such that it degrades under normal environmental conditions rapidly enough to dissipate in the environment, yet slowly enough that it will not degrade during normal shelf life, storage or shipment time periods. Such premature degradation would affect the strength of the carrier, and thus the structural integrity of the rigid carrier thereby diminishing its container retentive capability. Further, the material used for the rigid carriers must resist migration or separation of the various components of the material during melt processing and normal use.

In the past, a blended material of high density polyethylene or medium density polyethylene admixed with an ethylene-carbon monoxide copolymer in the concentrations of 3-50 percent ethylene-carbon monoxide copolymer, wherein the mixture contains about 0.1 to about 15 weight percent of carbon monoxide has been used for various articles. Such a degradable polyethylene ethylene-carbon monoxide copolymer material is described in German Patent document No. 2316697 entitled "Polymeric Substance Photo-Decomposable By the Action of Ultraviolet Irradiation."

The material disclosed in German patent document No. 2316697 is limited to high density polyethylene and medium density polyethylene having between 3-50 percent ethylene-carbon monoxide copolymer and discloses the use of copolymers of ethylene-propylene, ethylene-butene, ethylene-vinylacetate, ethylene-styrene, ethylene-methylacrylate and ethylene-hexene copolymers in the place of polyethylene. The polyethylene-ethylene-carbon monoxide blended materials disclosed in the No. 2316697 document degrades too rapidly for successful use as rigid article carriers and do not have the mechanical properties required for rigid article carriers. Accordingly, there exists a need in the art for an environmentally degradable polymeric composition having sufficient mechanical properties for use as an article carrier for filled containers, which exhibits balanced environmental degradation, excellent mechanical properties, extrudability, thermoformability and does not spontaneously suffer component migration or separation upon melt extrusion formation or during use.

SUMMARY OF THE INVENTION

The present invention comprises a degradable polymeric composition and articles prepared from such polymeric composition. The articles according to the present invention are useful as article carriers, environmentally degradable containers, including bottles, cans and thermoformed food trays, bagstock and filmstock, as well as closures and bottle base cups.

In a first embodiment of the invention, a degradable polymeric composition is provided by an admixture of high density polyethylene and ethylene-carbon monoxide copolymer. For degradable carrier uses, the ethylene-carbon monoxide copolymer comprises between 0.01 and 9.99 percent by weight of the mixture.

A second embodiment of the invention comprises an admixture of polypropylene and ethylene-carbon monoxide copolymer wherein the ethylene-carbon monoxide copolymer comprises between 0.01 and 99.99 percent by weight of the mixture.

A third embodiment of the invention comprises an admixture of linear low density polyethylene and ethylene-carbon monoxide copolymer wherein the ethylene-carbon monoxide copolymer comprises between 0.01 and 99.99 percent by weight of the mixture.

The present invention also provides a blend of high density polyethylene with linear low density polyethylene or polypropylene and all blends of two or more of the above mentioned suitable polymers.

The present invention provides a degradable polymer composition comprising: (a) an ethylene-carbon monoxide copolymer only in an amount sufficient to provide a total of substantially about 0.01 to 0.025 percent by weight of CO in the composition; and (b) a high density polyethylene constituting substantially the rest of the composition.

The present invention also provides a degradable polymer composition comprising: (a) an ethylene-carbon monoxide copolymer only in an amount sufficient to provide a total of substantially about 0.05 to 0.25 weight percent CO in the composition; and (b) a linear low density polyethylene constituting substantially the rest of the composition whereby the composition degrades in about two months or more as signified by an elongation of about 200% or less.

The present invention also provides a degradable polymer composition comprising: (a) an ethylene-carbon monoxide copolymer only in an amount sufficient to provide a total of substantially about 0.05 to 0.1 weight percent CO in the composition; and (b) polypropylene constituting substantially the balance of the composition whereby the composition degrades in about two months or more as signified by an elongation of at least about 20%.

BRIEF DESCRIPTION OF THE DRAWINGS

The details of the invention will be described in the accompanying specification in view of the drawings, in which.

DESCRIPTION OF THE INVENTION

Figure 1:
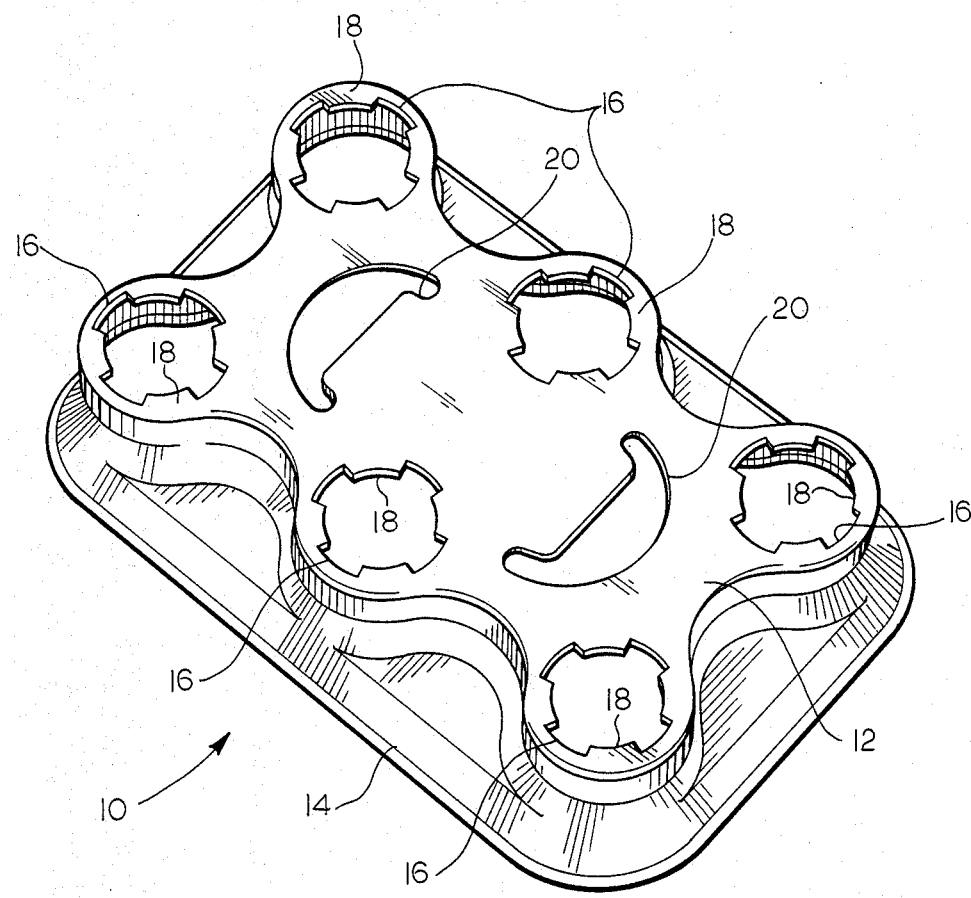
FIG. 1 is a perspective view of a rigid article carrier suited to the packaging of bottles.

The present invention comprises degradable polymeric compositions and articles prepared therefrom, which articles are particularly suitable for use as article carriers, particularly for bottles, and such composition being useful for the fabrication of containers themselves, bagstock, films, flexible containers, rigid containers, closures for containers, base cups for containers like bottles and similar packaging articles.

The degradable polymeric compositions according to the present invention show improved processing characteristics, including the capability to be formed by extrusion, thermoforming injection blow molding, stretch blow molding, extrusion blow molding and molding as part of a multilayer material composition. The compositions also show improved thermoformability, improved resistance to spontaneous delamination of the admixed component materials a balanced environmental degradation characteristic, as well as low cost of production compared to conventionally available degradable polymeric resinous material compositions.

As used herein, the term "high density polyethylene" is defined as a homopolymer of polyethylene having a melt index of 0.1 G/10 min and above; a density of between 0.942 grams/cc and 0.970 grams/cc; an ultimate elongation of at least 800 percent; a stiffness of 85,000 psi and above and an impact brittleness of less than $-105°$ F.

As used herein, the phrase "linear low density polyethylene" is defined as a polyethylene based resin having a melt index of between 0.1 G/10 min and 50 G/10 min; a density of between 0.910 G/cc and 0.940 G/cc; a crystalline melt point of between 115° C. and 130° C.; a secant modulus of between 20,000 psi and 70,000 psi; a long chain branching content of less than one long chain branch per polymer molecule; a short chain branching content of between 10 and 30 short chain branches per polymer molecule and with an ultimate elongation of greater than 100 percent.

The definition of linear low density polyethylene specifically includes copolymers of ethylene and an alpha-monoolefin of 4 to 12 carbon units which exhibit the above defined properties. Such ethylene-alpha-monoolefin copolymer based linear low density polyethylenes are commercially available from a variety of sources.

Such polymers are prepared by copolymerizing ethylene with an alpha-monoolefin containing 4 to 12 carbon atoms in the presence of certain conventional metallic catalysts of the same general type employed to prepare high density linear ethylene polymers. The polymerization conditions employed in their preparation differ somewhat, and somewhat modified catalysts will be employed. One of the techniques to prepare such polymers involves copolymerizing ethylene and butene-1 in the vapor phase in a fluidized bed process. By reason of the contraints imposed by carrying out the polymerization in the vapor phase, the ethylene polymers prepared by this process are limited to copolymers of ethylene and butene-1. By operating in solvent systems, copolymers can be prepared from alpha-monoolefin comonomers containing up to 12 carbon atoms. The preferred linear low-density ethylene polymers for inclusion in the degradable compositions of the present invention will be ethylene copolymers having polymerized therein at least one alpha-olefin comonomer containing 8 to 12 carbon atoms, and which optionally also will have copolymerized therein 1-butene or 1-hexene.

As used herein, the term "polypropylene" is defined as a stereoregular propylene polymer having a melt flow of 0.5 and above; a density of between 0.900 and 0.925 grams/cc; a tensile strength at yield of 3,500 psi and above; an ultimate elongation of greater than 150 percent and a stiffness of 120,000 and above.

As used herein, the term "ethylene-carbon monoxide copolymer" is defined as a copolymer of ethylene and carbon monoxide having a melt index of between 0.6 G/10 min and 1.3 G/10 min; a density of between 0.925 grams/cc and 0.935 grams/cc; an ultimate elongation of about 500 percent; a tensile strength of between 2,200 psi and 2,500 psi; and a carbon monoxide content of about one weight percent of the copolymer. Obviously, any ethylene-carbon monoxide copolymer having more than about one weight percent carbon monoxide can be used in smaller quantities to supply equivalent amounts of the carbon monoxide moiety.

The degradable polymeric compositions according to the present invention are well suited for the fabrication of containers of various descriptions. Such container uses include cans, bottle, large mouth jars as well as deep and shallow drawn food trays. The compositions are also well-suited for the fabrication of bag and film based articles like bags, film wraps and the like. The compositions are particularly wellsuited to the formation of rigid article carriers suitable for carrying bottles. Also contemplated according to the invention are bottle base cups and closures.

In a first embodiment of the invention, a degradable polymeric composition comprising an admixture of high density polyethylene and ethylene-carbon monoxide copolymer of up to 9.99 percent by weight ethylene-carbon monoxide copolymer and the remainder of high density polyethylene has been discovered to have surprisingly good properties for use as a rigid article carrier and for rigid, degradable containers. As illustrated in FIG. 1, such a rigid article carrier suited to carry a plurality of narrow neck containers, like bottles for beer and soft drinks, comprises a rigid carrier member 10 which includes a generally planar top panel 12 and a downwardly depending sidewall portion 14. The top panel 12 includes a plurality of generally circular container supporting apertures 16 which each include a plurality of inwardly extending rigid tab members 18 which engage a bottle neck below the threaded portion of the finish of a container, particularly a narrow neck bottle. Typically such rigid carrier members 10 include a pair of hand grips 20 for easy carrying of the rigid carrier member 10 when fully loaded with bottles.

An important feature of the high density polyethylene-ethylene-carbon monoxide copolymer compositions useful for the fabrication of rigid carriers for bottles in its balanced degradation when subjected to light. Prior compositions of ethylene-carbon monoxide copolymer and high density or medium density polyethylene have degraded under the influence of light too rapidly. Also, prior compositions have not had sufficient stiffness in the thermoformed article, like the rigid carrier member 10, to hold filled bottles. Typically, a 125,000 psi stiffness, according to ASTM standard D-747, has been a minimum stiffness required for article carriers like the article carrier disclosed at FIG. 1. Prior degradable materials have not had sufficient stiffness coupled with a balanced degradability characteristic and a resistance to spontaneous migration of components when melt extruded, while still being extrudable and thermoformable to be suitable as article carriers.

Table I illustrates that the high density polyethylene-ethylene-carbon monoxide copolymer compositions wherein the ethylene-carbon monoxide copolymer content is no greater than 9.99 percent by weight of the composition exhibit the requisite stiffness for suitability for use as an article carrier.

The same general stiffness criteria are acceptable for self-supporting containers and food trays fabricated from the new compositions according to the present invention. In Table I, HDPE represents high density polyethylene and ECO represents ethylene-carbon monoxide copolymer.

TABLE I

STIFFNESS CHARACTERISTICS OF ADMIXTURES OF HDPE AND ECO

| HDPE/ECO ADMIXTURES | STIFFNESS (PSI) |
|---|---|
| 2.5% ECO | 138,600 |
| 5% ECO | 136,800 |
| 10% ECO | 136,700 |
| 15% ECO | 123,100 |
| 25% ECO | 109,300 |
| 50% ECO | 95,200 |
| 100% HDPE | 140,000 |

Coupled with the excellent stiffness characteristics of the 0–9.99 percent ethylene-carbon monoxide content composition is the surprising discovery that articles formed from up to 9.99 percent by weight ethylene-carbon monoxide copolymer admixtured with high density polyethylene show a substantially extending useful life prior to degradation by light exposure.

Figure 2:
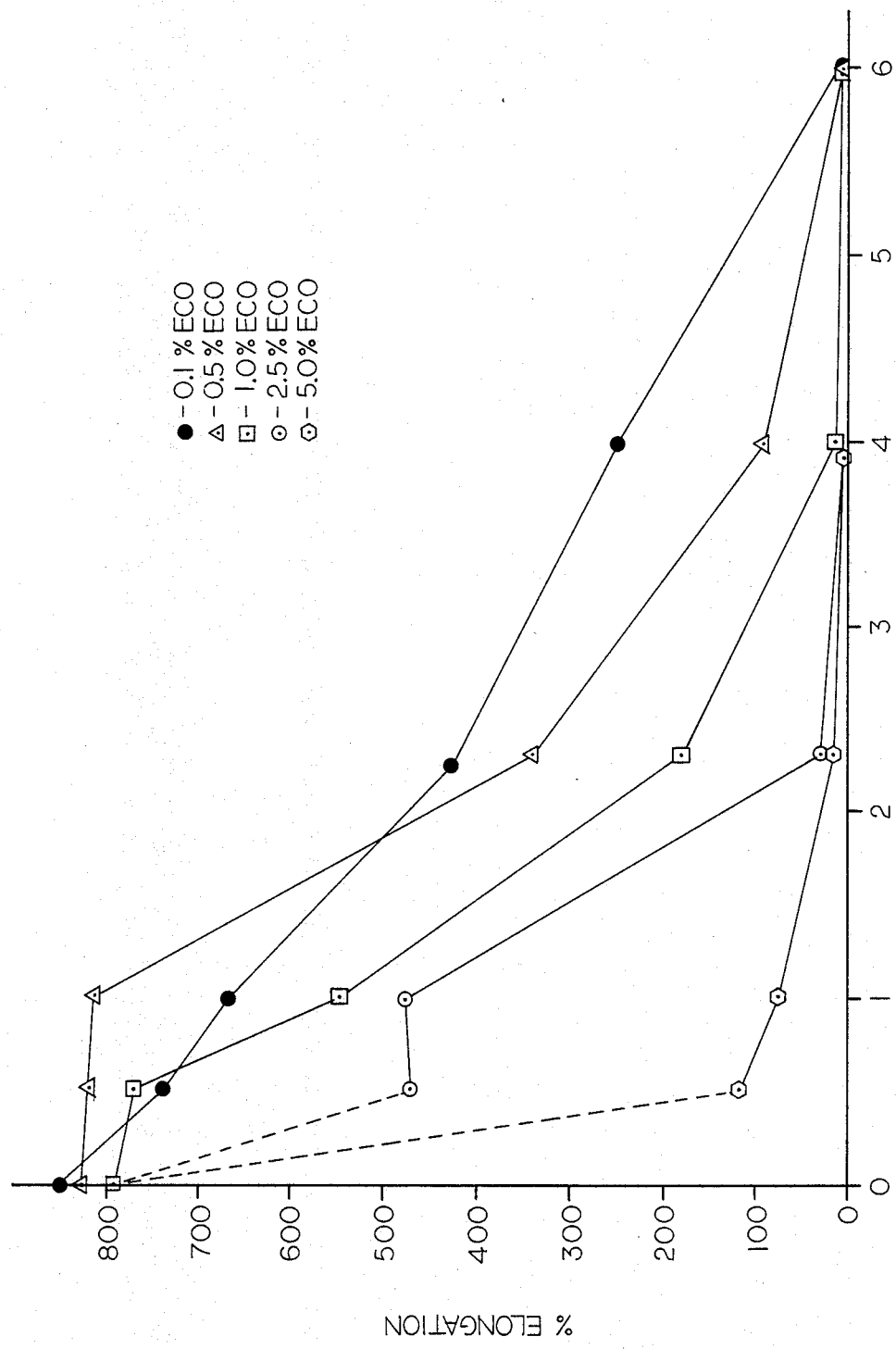
FIG. 2 shows the curves of the time of light exposure versus percent of elongation for various admixtures by percentage composition of high density polyethylene and ethylene-carbon monoxide copolymer.

FIG. 2 shows the curves of time of light exposure versus elongation for various admixtures by percentage composition, illustrating the degradation behavior of the compositions formed by admixing high density polyethylene and ethylene-carbon monoxide copolymer. The vertical axis represents the percent of elongation of a plastic strip which is defined herein as the final length of the plastic strip minus the initial length of the plastic strip divided by the initial length of the plastic strip at the point of fracture of the plastic strip upon elongation according to ASTM standard D-638-77a, which is incorporated herein by reference. The horizontal axis represents ultraviolet light exposure time for accelerated simulated environmental exposure to ultraviolet light. The exposure time is calculated in equivalence of natural months of sunlight based upon a 12 hour day of natural sunlight.

According to the present invention, it has been discovered that the admixtures of high density polyethylene and ethylene-carbon monoxide copolymer of up to 9.99 percent by weight ethylene-carbon monoxide copolymer exhibits surprising balanced degradation upon exposure to ultraviolet light such that they maintain substantial structural integrity under the elongation test for periods of two months or more. Accordingly, mixtures of up to 9.99 percent ethylene-carbon monoxide in high density polyethylene exhibit not only excellent stiffness properties required for article carriers, as described above, but also show the balanced property of slow degradation upon exposure to light. Thus, the carriers do not degrade rapidly enough to lose the structural integrity of the carrier during shipment, storage or shelf-life and yet degrade upon months of environmental exposure. The carriers fabricated from five percent by weight ethylene-carbon monoxide in 95 percent by weight high density polyethylene clearly degrade more rapidly upon exposure to sunlight than other compositions and are less preferred for article carriers.

A preferred high density polyethylene resin, useful according to the present invention, is that material supplied by Allied Chemical Corporation and designated product 60-003 HDPE. The material has the following physical properties: a melt flow of 0.3 G/10 min; a density of 0.960 grams/cc; an ultimate elongation of about 800%; a stiffness of 140,000 PSI and an impact brittleness of less than −105° F.

A preferred ethylene-carbon monoxide copolymer, useful for all embodiments of the present invention, is that material supplied by Union Carbide Corporation as product DHDG-4164 ECO. The ethylene-carbon monoxide copolymer supplied by Union Carbide Corporation has the following physical properties: a melt index of 1.2 G/10 min.; a density of 0.934 grams/cc; an ultimate elongation of 520%; a tensile strength of 2250 psi and a carbon monoxide content of a range of 0.7–1.1 percent carbon monoxide over the entire range.

With all embodiments of the invention, it is preferred to use granular polymers for admixing together by any conventional means to form the proper weight percent of the appropriate polymers mixed with the ethylene-carbon monoxide copolymer. Typically, the granules of separate components of the admixture are mixed together in a granule mixer to form a homogeneous granular feedstock. The granular feedstock is processed by extrusion or similar processing to form sheets, tubes or container parisons which are then converted into final products by the methods described above. Preferably, additional mixing occurs during the melting and forming process to assure a nearly homogeneous polymeric blend which is processed according to the methods described above to form the final desired articles according to the present invention.

Granular blending is preferably accomplished with a multiple compartment, belt-fed Whitlock Blender, equipped with a mixing bar. Granular mix is fed to the extruder by pneumatic tube transport. To form melt extruded sheetstock, a Davis-Standard Thermatic extruder, equipped with System 101 controller and 6 inch screw, with an L/D=34, fed to a Kenics mixer and 80 inch autoflex die is preferably used to extrude the sheetstock.

In the second embodiment of the present invention which is useful for forming rigid article carriers, rigid containers, food trays and the like, a degradable polymeric composition comprising an admixture of polypropylene and ethylene-carbon monoxide copolymer is provided. The polypropylene and ethylene-carbon monoxide copolymer admixtures according to the present invention include admixtures having ethylene-carbon monoxide copolymer only in an amount sufficient to provide a total of substantially about 0.05 to 0.1 weight percent CO in the composition and polypropylene constituting substantially the balance of the composition whereby the composition degrades in about two months or more as signified by an elongation of at least about 20%.

The admixtures of polypropylene and ethylene-carbon monoxide also show excellent properties for use as rigid articles, including article carriers and containers.

Figure 3:
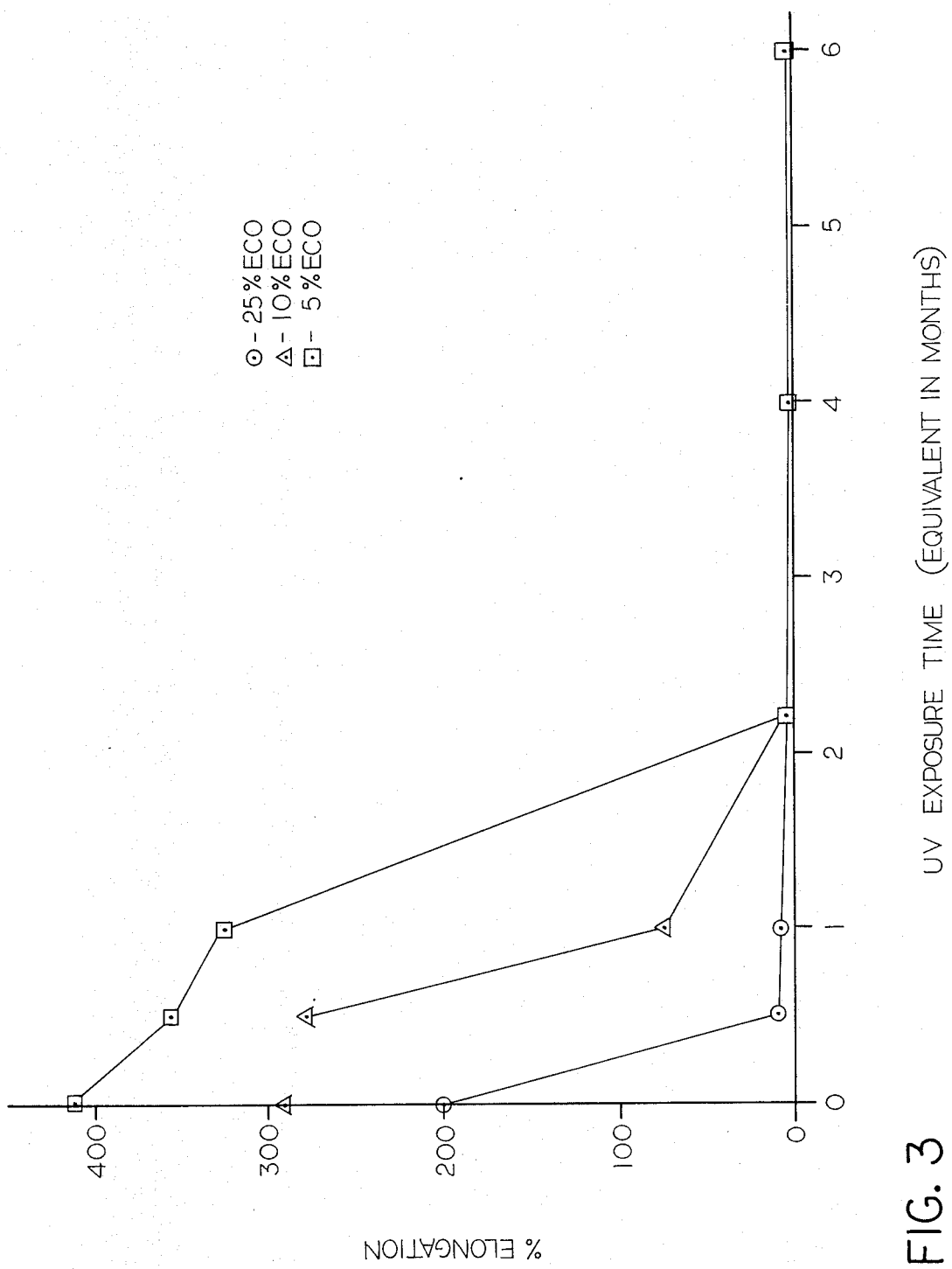
FIG. 3 shows the curves of the light exposure versus percent of elongation for various admixtures by percentage composition illustrating degradation behavior of the composition of polypropylene and ethylene-carbon monoxide copolymer.

FIG. 3 shows the curves of time of light exposure versus elongation for various admixtures by percent composition, illustrating the degradation behavior of the compositions formed by admixing polypropylene and ethylene-carbon monoxide copolymer. The vertical axis represents the percent of elongation of a plastic strip under ASTM standard 638-77a, as with the illustrations of FIG. 2. Similarly, the horizontal axis represents ultraviolet light exposure time from accelerated exposure to ultraviolet light as for FIG. 2.

As the curves in FIG. 3 illustrate, admixtures of polypropylene and ethylene-carbon monoxide copolymer between 5 percent and 25 percent show adequate structural integrity with balanced degradation properties for a period of two months or more as compared to native polypropylene which shows virtually no degradation over a 6 month period. Particularly preferred are compositions including 5–10 percent by weight ethylene-carbon monoxide and 95–90 percent by weight polypropylene which admixtures exhibit excellent stability over short times to allow storage shipment and sale, then degrade and yet have adequate stiffness for rigid articles as illustrated in Table II below.

Table II represents stiffness data for various admixtures of polypropylene and ethylene-carbon monoxide copolymer. In Table II, PP represents polypropylene and ECO represents ethylene-carbon monoxide copolymer.

TABLE II

STIFFNESS CHARACTERISTICS OF ADMIXTURES OF PP AND ECO

| PP/ECO ADMIXTURES | STIFFNESS (PSI) |
|---|---|
| 5% ECO | 166,000 |
| 10% ECO | 149,000 |
| 25% ECO | 139,000 |
| 100% PP | 152,000 |

As illustrated by the degradation curves of FIG. 3 and the stiffness data of Table II, the most preferred material for rigid carriers for bottles is an admixture of 5–10 percent by weight admixture of ethylene-carbon monoxide with 95–90 percent by weight polypropylene. However, where stiffness is not critical, such as various flexible container applications, film, bagstock and the like, other admixtures are suitable.

The polypropylene-ethylene-carbon monoxide copolymer admixtures according to the present invention also have the properties of excellent extrudability, thermoformability, the capability to be extrusion blow molded, injection blow molded and the like using conventional machinery which makes them particularly suitable for containers and food trays. Further, the material does not suffer from spontaneous migration of components upon melt extrusion or use.

A third embodiment of the present invention relates to compositions of matter comprising admixtures of linear low density polyethylene with ethylene-carbon monoxide copolymer. Such compositions provide an admixture which is environmentally degradable and exhibit the excellent processability characteristics described above for the fabrication of flexible packaging. Such compositions are particularly useful for flexible films, bagstock, flexible containers, like squeeze bottles, and the like.

Another suitable composition of matter according to the present invention for forming flexible, degradable polymeric composition for useful flexible article carriers comprises an admixture of an ethylene-carbon monoxide copolymer only in an amount sufficient to provide a total of substantially about 0.05 to 0.25 weight percent CO in the composition and a linear low density polyethylene constituting substantially the rest of the composition whereby the composition degrades in about two months or more as signified by an elongation of about 200% or less.

Figure 4:
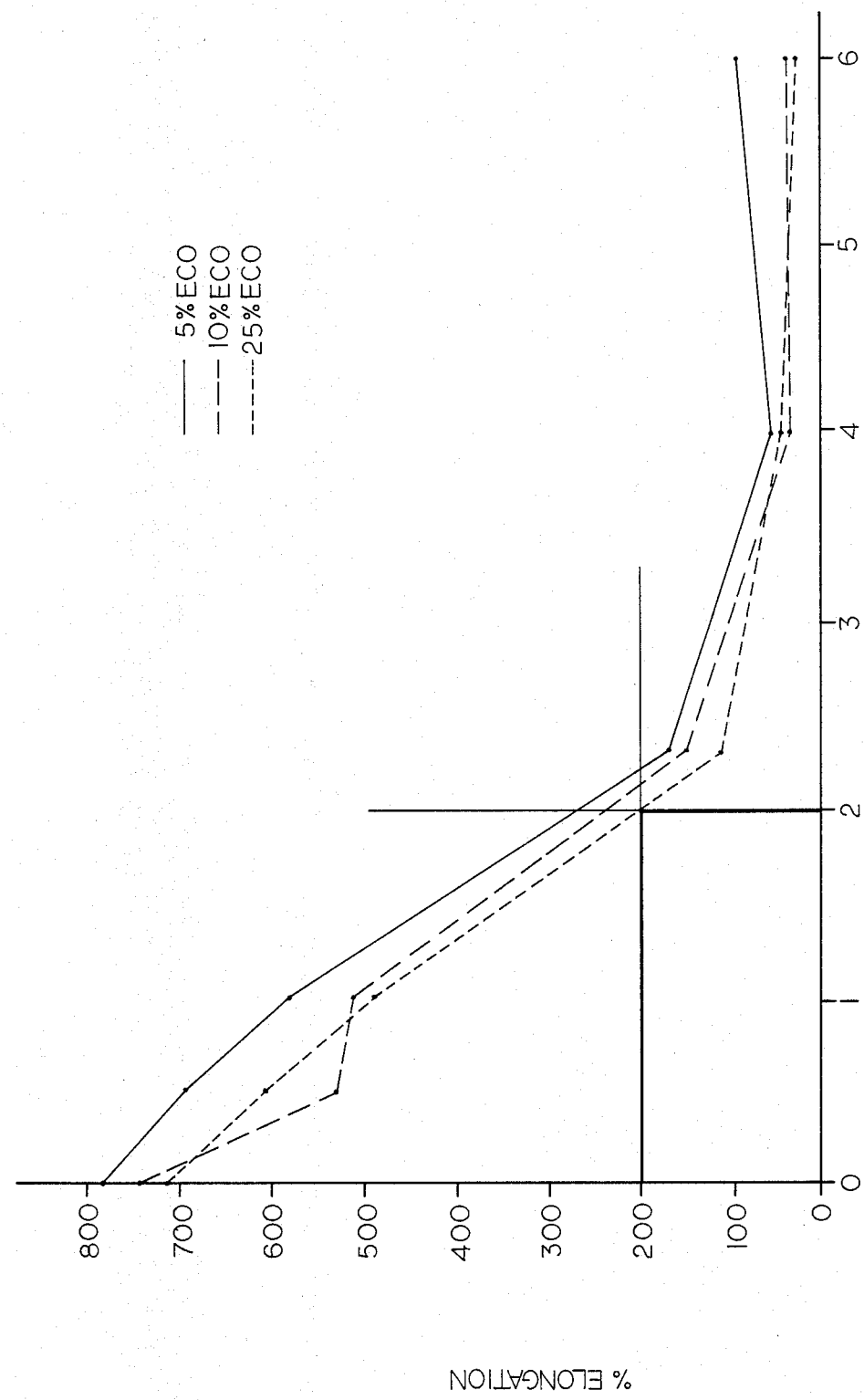
FIG. 4 shows the curves of time of light exposure versus percent of elongation for various admixtures by percentage composition illustrating degradation behavior of the composition of linear low density polyethylene and ethylene-carbon monoxide copolymer.

FIG. 4 shows the curves of time of light exposure versus elongation for various admixtures by percentage composition illustrating the degredition behavior of the compositions formed by admixing linear low density polyethylene and ethylene-carbon monoxide copolymer. The axes for FIG. 4 are identical with and represent the same physical variables as those for FIGS. 2 and 3. As illustrated in FIG. 4, it has been discovered according to the present invention that admixtures of linear low density polyethylene and ethylene-carbon monoxide copolymer wherein the concentration of the ethylene-carbon monoxide copolymer in the admixture is between 5 and 25 percent are preferred according to the present invention. As illustrated in FIG. 4, compositions having 5–25 percent ethylene-carbon monoxide copolymer show balanced degradability characteristics, suffering substantial degradation after two months of exposure, yet still maintaining adequate flexibility in these composition ranges for packaging and article carrier applications.

Figure 5:
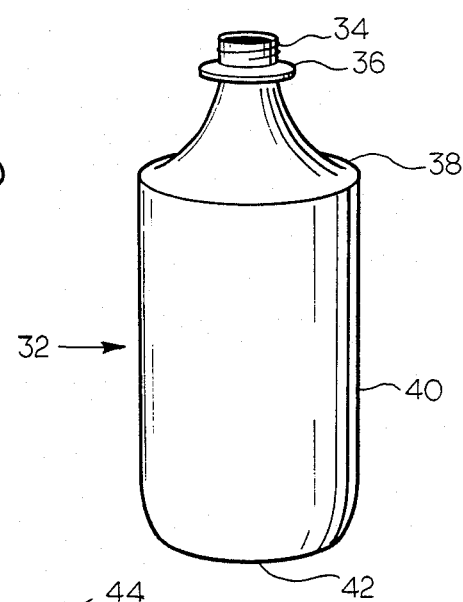
FIG. 5 shows a perspective view of a bottle according to the present invention.

The high density polyethylene and ethylene-carbon monoxide copolymer compositions according to the present invention are also useful for fabricating free-standing and nonfree-standing bottles, closures for bottles, bottle base cups for nonfree-standing bottles as well as deep drawn food trays. A typical self-supporting plastic bottle fabricated from the high density polyethylene and ethylene-carbon monoxide copolymer compositions according to the present invention is illustrated at FIG. 5 as a narrow neck bottle 32. The bottle 32 includes a threaded finish portion 34, a bottle handling ledge 36, a shoulder portion 38, a sidewall portion 40 and an enclosed bottom portion 42. The bottle has a single opening in the center portion of the threaded finish and is thereafter totally enclosed for containing fluids.

Figure 6:
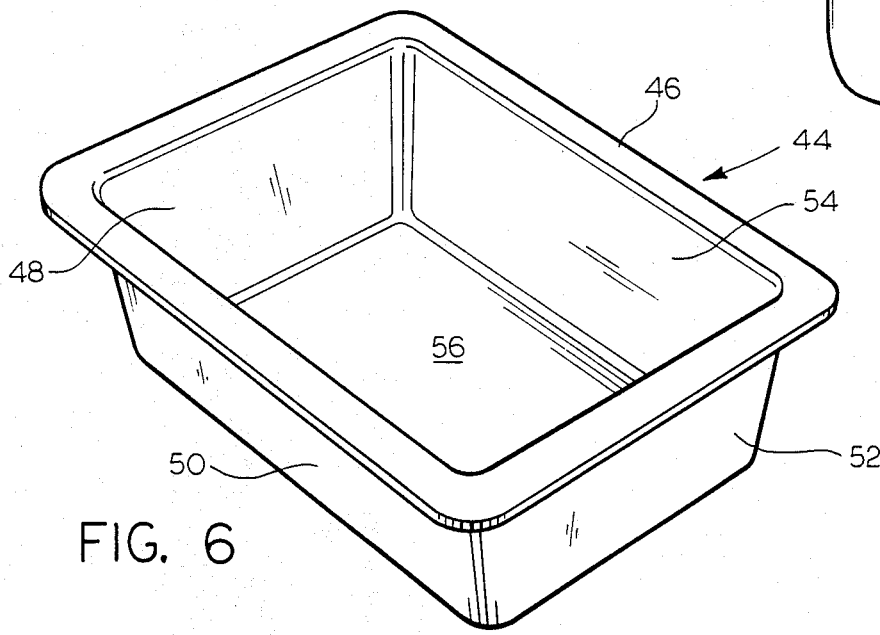
FIG. 6 shows a perspective view of a deep drawn food tray according to the present invention.

The deep drawn food tray according to the present invention is illustrated at FIG. 6 by food tray 44. The tray 44 includes a flat upper sealing rim 46, which is adapted to be sealed with a flexible film closure (not illustrated). A plurality of interconnected side panels 48, 50, 52 and 54 form the main side panel of the tray, which depends downwardly from the flat upper sealing rim 46 and terminates in a bottom panel 56 which completely encloses the bottom of the tray 44 and is integral with the side panels 48–54.

Figures 7, 8:
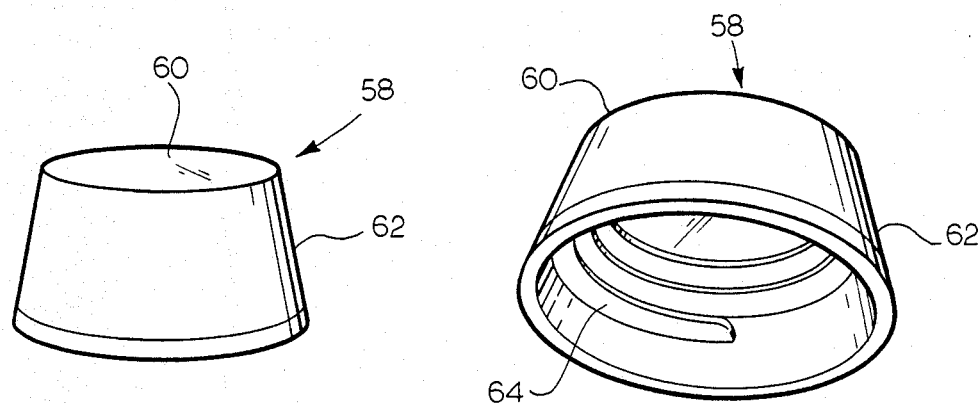
FIG. 7 shows a side view of a closure according to the present invention.
FIG. 8 shows a perspective view illustrating the threads of a closure according to the present invention.

A closure according to the present invention fabricated from the high density polyethylene and ethylene-carbon monoxide copolymer composition is illustrated in FIGS. 7 and 8. A closure 58 according to the invention includes a top panel 60, a downwardly depending side panel 62 integral with and depending downwardly from top panel 60 and at least one internal thread 64 disposed upon the inner surface of the side panel 62 and fitted to engage threads on a container, like the threads upon the finish of bottle 32 described herein before.

Figure 9:
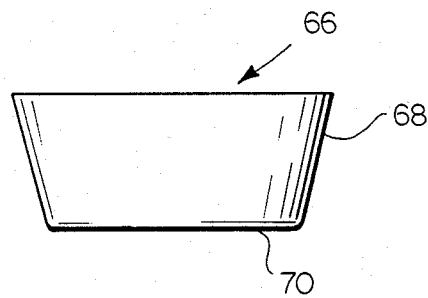
FIG. 9 shows a side view of a base cup according to the present invention.
Figure 10:
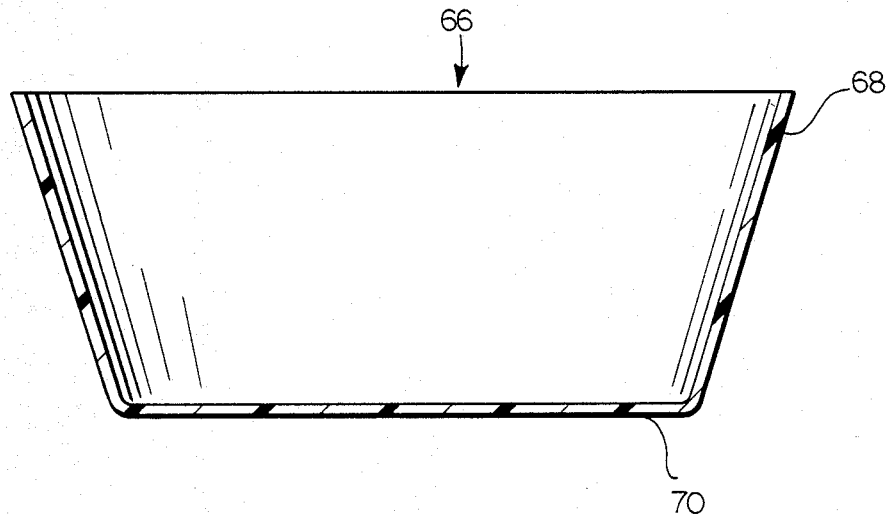
FIG. 10 shows a cross-sectional view of a base cup according to the present invention.

Additionally, a base cup like the base cup 66 illustrated in FIGS. 9 and 10 may be fabricated from the high density polyethylene and ethylene-carbon monoxide copolymer composition according to the present invention. Such a base cup 66 should typically include an annular sidewall portion 68 for engaging the bottom sidewall portion of a bottle and a bottom portion 70 for supporting the bottle within the base cup 66. Typically, such a base cup 66 is sealed by an adhesive to the bottle which it is suited to contain and hold in an upright position.

The closure illustrated in FIGS. 7 and 8, the food tray illustrated in FIG. 6 and the bottle illustrated in FIG. 5 may be alternatively fabricated from the polypropylene and ethylene-carbon monoxide copolymer compositions according to the present invention. Similarly, the closure illustrated in FIGS. 7 and 8 and the base cup illustrated in FIGS. 9 and 10 may be fabricated from the linear low density polyethylene and ethylene-carbon monoxide copolymer compositions according to the present invention.

What is claimed is:

1. A degradable polymer composition comprising:
   (a) an ethylene-carbon monoxide copolymer only in an amount sufficient to provide a total of substantially about 0.01 to 0.025 percent by weight of CO in the composition; and
   (b) a high density polyethylene constituting substantially the rest of the composition.

2. A degradable polymer composition comprising:
   (a) an ethylene-carbon monoxide copolymer only in an amount sufficient to provide a total of substantially about 0.05 to 0.25 weight percent CO in the composition; and
   (b) a linear low density polyethylene constituting substantially the rest of the composition whereby the composition degrades in about two months or more as signified by an elongation of about 200% or less.

3. The degradable polymer composition defined in claim 2 wherein the composition includes:
   (a) about 0.10 percent by weight CO provided by the ethylene-carbon monoxide copolymer.

4. A degradable polymer composition comprising:
   (a) an ethylene-carbon monoxide copolymer only in an amount sufficient to provide a total of substantially about 0.05 to 0.1 weight percent CO in the composition; and
   (b) polypropylene constituting substantially the balance of the composition whereby the composition degrades in about two months or more as signified by an elongation of about 200% or less.

5. The degradable polymer composition defined in claim 4 wherein the composition has about 0.1 weight percent CO in the composition.

6. A single piece rigid degradable plastic article carrier suitable to carry a plurality of narrow neck containers comprising:
   a generally planar top panel;
   a sidewall portion integral with the periphery of said top panel and depending downwardly therefrom; and
   said generally planar top panel including a plurality of container supporting apertures;
   wherein said article carrier is made of a composition comprised of
   (a) an ethylene-carbon monoxide copolymer only in an amount sufficient to provide a total of substantially about 0.01 to 0.025 weight percent CO, and
   (b) high density polyethylene constituting substantially the balance of the composition.

7. A single piece rigid degradable plastic article carrier comprising:
   a generally planar top panel;
   a sidewall portion integral with the periphery of said top panel and depending downwardly therefrom; and
   said generally planar top panel including a plurality of container supporting aperture portions;
   wherein said article carrier is made from a composition comprising
   (a) an ethylene-carbon monoxide copolymer only in an amount sufficient to provide a total of substantially about 0.05 to 0.1 weight percent CO and
   (b) polypropylene constituting substantially the balance of the composition whereby the composition degrades in about two months or more as signified by an elongation of about 200% or less.

8. The article carrier defined in claim 7 wherein said article carrier has sufficient ethylene-carbon monoxide copolymer to provide the composition with about 0.1 weight percent CO.

9. A flexible degradable article plastic composition carrier suited to carry a plurality of cans comprising:
a unitary flexible plastic web portion; and
a plurality of can supporting aperture portions disposed within said web portion;
wherein said article carrier plastic composition comprises
(a) an ethylene-carbon monoxide copolymer only in an amount sufficient to provide a total of substantially about 0.05 to 0.25 weight percent CO and
(b) linear low density polyethylene constituting substantially the balance of the composition whereby the composition degrades in about two months or more as signified by an elongation of about 200% or less.

10. The article carrier defined in claim 9 wherein there is about 0.10 percent by weight CO ethylene-carbon monoxide copolymer and linear low density polyethylene.

11. A plastic composition bottle comprising:
an open finish portion;
a shoulder portion depending downwardly from and integral with said finish portion;
a sidewall portion depending downwardly from said shoulder portion and integral therewith; and
an enclosed bottom portion integral with and depending downwardly from said sidewall portion to form an enclosed container;
wherein the bottle composition comprises
(a) an ethylene-carbon monoxide copolymer only in an amount sufficient to provide a total of substantially about 0.01 to 0.025 percent by weight CO and
(b) a high density polyethylene constituting substantially the balance of the composition.

12. A plastic composition closure comprising:
a top panel;
a downwardly depending side panel integral with and downwardly depending from said top panel; and
at least one internal thread disposed upon the internal surface of said side panel;
wherein said closure is comprised of a plastic composition as defined in claim 1.

13. A bottle plastic composition base cup comprising:
an annular sidewall portion terminating in and integral with generally flat bottom portion wherein said base cup is of a composition as defined in claim 1.

14. A plastic composition food tray comprising:
a flat upper sealing rim portion;
a plurality of interconnected downwardly depending side panel portions which are integral with one another and with said upper sealing rim; and
a bottom panel interconnected with and integral with all of said panels to form a closed bottom tray;
wherein said plastic composition is defined in claim 1.

15. A plastic composition container comprising:
an open finish portion;
a shoulder portion depending downwardly from and integral with said finish portion;
a sidewall portion depending downwardly from said shoulder portion and integral therewith; and
an enclosed bottom portion integral with and depending downwardly from said sidewall portion to form an enclosed container;
wherein the container being of a plastic composition as defined in claim 4.

16. A plastic composition closure comprising:
a top panel;
a downwardly depending side panel integral with and downwardly depending from said top panel; and
at least one internal thread disposed upon the internal surface of said side panel;
wherein said closure plastic composition is defined in claim 4.

17. A plastic composition food tray comprising:
a flat upper sealing rim portion;
a plurality of interconnected downwardly depending side panel portions which are integral with one another and with said upper sealing rim; and
a bottom panel interconnected with and integral with all of said panels to form a closed bottomed tray;
wherein said tray plastic composition is defined in claim 4.

18. A plastic composition closure comprising:
a top panel;
a downwardly depending side panel integral with and downwardly depending from said top panel; and
at least one internal thread disposed upon the internal surface of said side panel;
wherein said closure plastic composition is defined in claim 2.

19. A plastic composition bottle base cup comprising:
an annular sidewall portion terminating in and integral with a generally flat bottom portion wherein said base cup plastic composition is defined in claim 2.

* * * * *